US005396229A

United States Patent [19]

Miyauchi

[11] Patent Number: 5,396,229

[45] Date of Patent: Mar. 7, 1995

[54] SELECTIVE CALLING RECEIVER

[75] Inventor: Motoya Miyauchi, Yokohama, Japan

[73] Assignee: Matsushita Electric Industrial Co., Ltd., Osaka, Japan

[21] Appl. No.: 848,719

[22] Filed: Mar. 9, 1992

[30] Foreign Application Priority Data

Mar. 15, 1991 [JP] Japan .................................. 3-074180

[51] Int. Cl.[6] .............................................. H04Q 7/00

[52] U.S. Cl. ................................ 340/825.44; 370/94.1

[58] Field of Search .................. 370/94.1; 340/825.44, 340/825.5

[56] References Cited

U.S. PATENT DOCUMENTS

| | | | |
|---|---|---|---|
| 4,855,731 | 8/1989 | Yoshizawa et al. | 340/825.44 |
| 4,872,005 | 10/1989 | De Luca et al. | 340/825.44 |
| 4,894,649 | 1/1990 | Davis | 340/825.44 |
| 4,897,835 | 1/1990 | Gaskill | 370/94.1 |
| 4,949,085 | 8/1990 | Fisch et al. | 340/825.44 |
| 4,988,991 | 1/1991 | Motegi | 340/825.5 |
| 5,012,219 | 4/1991 | Henry | 340/825.44 |
| 5,258,751 | 11/1993 | De Luca et al. | 340/825.44 |

FOREIGN PATENT DOCUMENTS

| | | | |
|---|---|---|---|
| 120576 | 4/1989 | Japan . | |
| WO90/10359 | 9/1990 | WIPO | H04Q 7/00 |

*Primary Examiner*—Donald J. Yusko
*Assistant Examiner*—Edward Merz
*Attorney, Agent, or Firm*—Stevens, Davis, Miller & Mosher

[57] ABSTRACT

A selective calling receiver comprises a receiving section for receiving data including call numbers of individual receivers, function designation numbers and message data, an indicating unit for indicating reception of the data, a RAM for storing received message data, and an LCD for displaying the stored message data. The selective calling receiver further comprises a resettable timer which starts a time counting operation upon completion of reception of the message data following the call number of the receiver and outputs a signal upon expiration of a predetermined time period. When the selective calling receiver has subsequently received the call number of the receiver before the timer completes the time counting operation, it stores in the RAM all message data which have been received before the completion of the time counting operation of the timer. The receiver starts an indicating operation in response to the output signal from the timer which is produced upon completion of the time counting operation of the timer, and continuously displays the message data which are stored in the RAM.

6 Claims, 3 Drawing Sheets

SELECTIVE CALLING RECEIVER

BACKGROUND OF THE INVENTION

This invention relates to a selective calling receiver which performs an indicating operation only once even when it has received a number of messages successively and displays the received messages in accordance with the priority order of the messages.

Conventional selective calling receivers are constructed to perform an indicating operation and a display operation at each reception of a message. Besides, the conventional selective calling receivers are constructed to display received messages in the order of reception or in a predetermined order. However, since the conventional selective calling receivers are constructed to perform an indicating operation and a display operation at every message reception, they have drawbacks such that, when a number of messages are sent to a conventional selective calling receiver successively as in the case of conducting information service, the receiver receives subsequent messages while it is performing an indicating operation and a display operation, so that the receiver is troubled to perform an indicating operation and a display operation frequently. Further, when an indicating unit of a receiver performs an indicating operation for a previous message reception while the receiver is receiving a subsequent message, there arise problems such that a power supply voltage falls due to excessive power consumption, a noise having a singing frequency is generated to thereby deteriorate reception sensitivity of the receiver in the subsequent message reception, and further it becomes difficult for the receiver to promptly display a message of the highest necessity as the number of stored messages increases.

SUMMARY OF THE INVENTION

The present invention is intended to solve the foregoing problems of conventional selective calling receivers, and a first object of the present invention is to provide a selective calling receiver which performs only one indicating operation for messages which have been received sequentially by the time when the receiver performs an indicating operation and a display operation from the start of receiving messages.

A second object of this invention is to provide a selective calling receiver which is operative to display all received messages sequentially subsequent to completion of the only one indicating operation.

A third object of this invention is to provide a selective calling receiver which is operative to display messages in accordance with the priority order that is specified for addresses determined by a call number and a function designation number of the receiver and which is operative to read out messages in accordance with the priority order when performing a read-out operation.

In order to attain the above objects, the selective calling receiver of the present invention comprises a timer which is constructed to be reset and to start its operation at every completion of reception of a message, which follows a call number of the receiver, and to produce a signal for making the receiver proceed to an indicating operation and a display operation upon expiration of a predetermined time period, whereby only a single time indicating operation and succeeding sequential display operations are performed for all of the messages which have been received up until the completion of the timer operation. Further, the selective calling receiver of the present invention comprises a memory circuit which classifies and stores received messages in accordance with addresses each of which is determined by a call number and a function designation number so that the stored messages are read out from the memory circuit and are displayed sequentially in accordance with the predetermined priority order of addresses.

According to the present invention, when the selective calling receiver successively receives a plurality of messages, all messages, which have been sent to the receiver before the timer that has been reset simultaneously with the arrival of an incoming message produces an output signal, are received and stored by the receiver, and all of the stored messages are displayed sequentially after performing a single indicating operation. Thus, since no indicating operation is performed when a second and subsequent messages are received, the selective calling receiver of the present application is not troubled with deterioration of reception sensitivity and interference caused by a noise having a singing frequency. In addition, in the display operation for received messages and in the read-out operation for stored messages, the messages are displayed in accordance with the priority order of addresses, so that it is possible to seek out a required message promptly.

DESCRIPTION OF THE PREFERRED EMBODIMENTS

Figure 1:
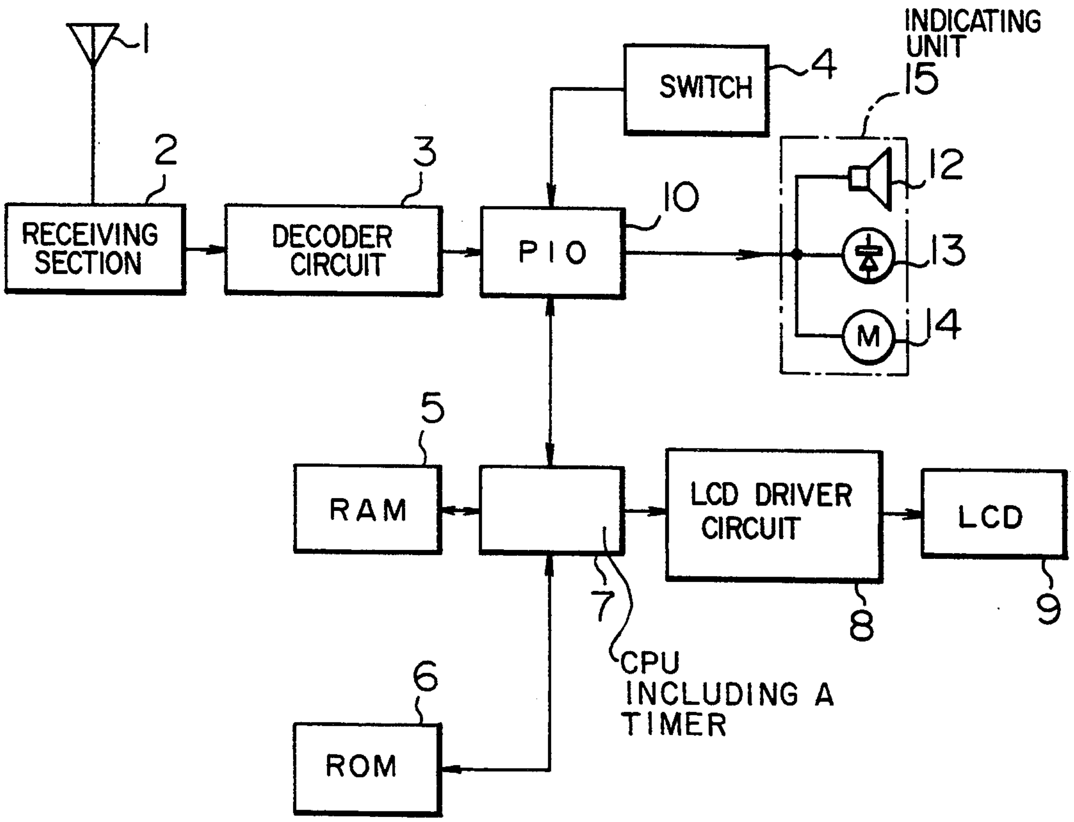
FIG. 1 is a block diagram showing a selective calling receiver of an embodiment of this invention.

Referring to FIG. 1, the selective calling receiver of this invention comprises a receiving section 2 for amplifying and demodulating a radio signal received by an antenna 1, a decoder circuit 3 for decoding a demodulated signal, a switch 4, an RAM 5 for storing received message data, a ROM 6 for storing a call number of the receiver and its operational function for the purpose of setting, a CPU 7 for controlling processing of received message data and an indicating/display operation, a liquid crystal display (LCD) unit 9 for displaying received messages and other information, a driver circuit.8 for driving the liquid crystal display unit 9, an indicating unit 15 including at least one of a speaker 12 for producing an acoustic indicating signal, a light-emitting diode 13 for producing a visual indicating signal and a motor 14 for producing a vibratory indicating signal, and a controller (PIO) 10 for controlling inputs and outputs of the CPU 7.

Next, an operation of the selective calling receiver constructed as described above will be explained. A radio signal received by the antenna 1 is amplified and demodulated by the receiving section 2, and a resultant signal is decoded in the form of a readable signal by the decoder circuit 3. In addition to the decoding function for decoding a signal from the receiving section 2, the decoder circuit 3 operates to compare a signal from the receiving section 2 with a call number of the receiver stored therein and to acknowledge reception of an incoming call in response to a coincidence in the comparison.

The decoder circuit 3 further functions to instruct an interrupt to the CPU 7 when it has been decided that processing of message data has been completed. In response to the interrupt instruction, the CPU 7 operates to take in message data by way of the controller (PIO) 10 and transfers the taken-in data to the RAM 5. After the message data have been taken in, the CPU 7 operates through the controller (PIO) 10 to activate the indicating means 15 including at least one of the speaker 12, light-emitting diode 13 and motor 14 so that the indicating unit performs an indicating operation, and the CPU 7 also operates by way of the driver circuit 8 to make the liquid crystal display unit 9 display the received message. The message is read out by operating the read-out switch 4.

Figure 2:
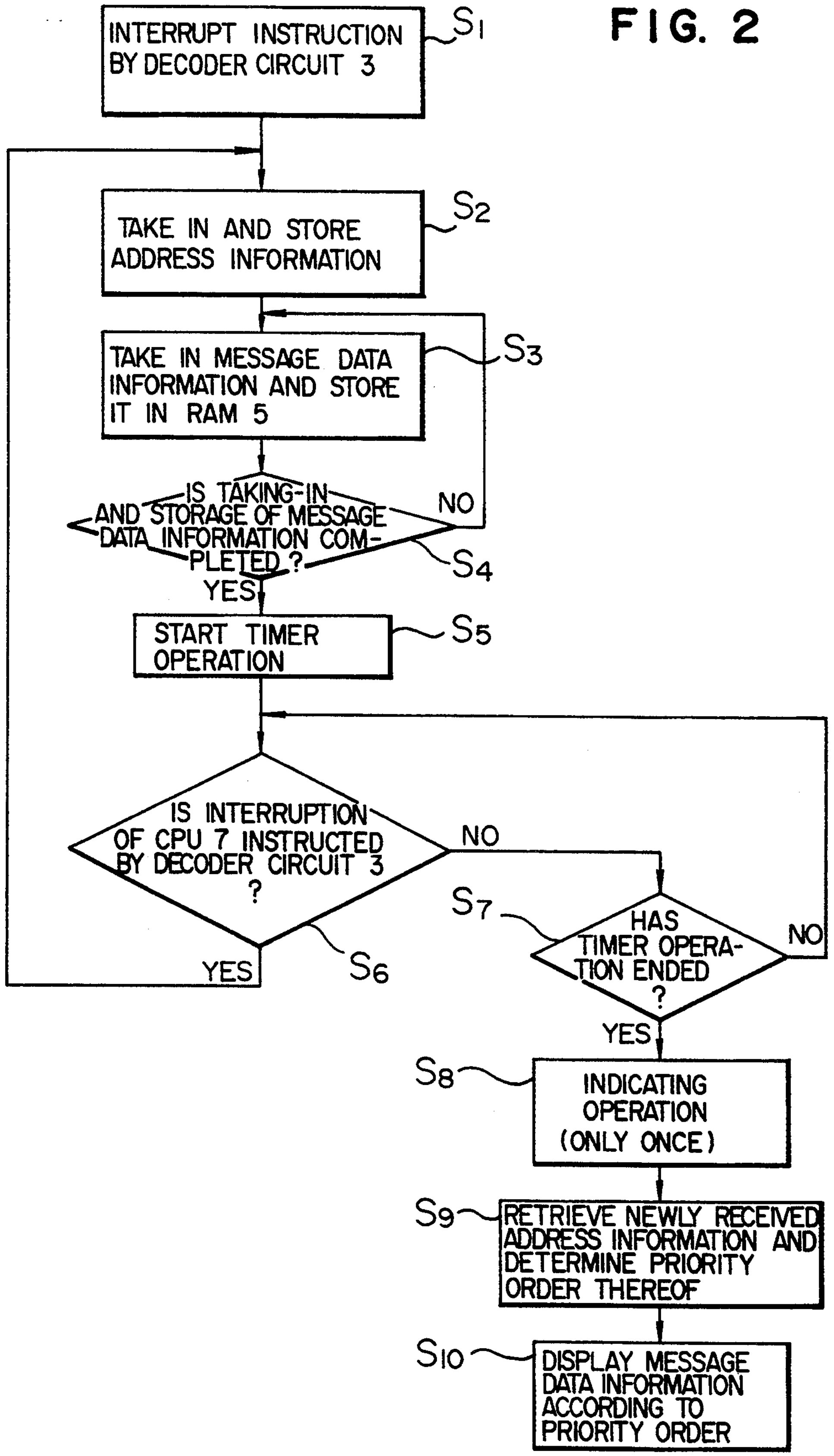
FIG. 2 is a flowchart showing the operation of the CPU when the receiver shown in FIG. 1 has received a newly incoming message.

The operation performed when the selective calling receiver has received a new message will be explained with reference to the flowchart of FIG. 2.

Step 1: The decoder circuit 3 detects a preamble of a signal outputted from the receiver section 2, collates a sync signal and a call number of the receiver, and instructs an interrupts to the CPU 7 if the call number coincides.

Step 2: In the field of information service, a receiver often has a plurality of call numbers. Further, since each call number contains respective function bits, a receiver can have a number of information service address numbers. Then, the CPU 7 determines a relevant address from a call number of the receiver and a function bit in response to an interrupt instructed by the decoder circuit 3, takes in the address information, and stores it in a new memory area as a new incoming address number.

Step 3: The CPU 7 takes in message data information and stores it in the RAM 5.

Step 4: The step 3 is repeated, until taking-in and storage of all message data information by the RAM 5 is completed.

Step 5: Upon deciding that the taking-in and storage of message data information by the RAM 5 have been completed, the CPU 7 resets the timer and then starts a time counting operation (this timer is made to operate as a resettable timer in accordance with the execution of a program by the CPU 7).

Step 6: The decoder circuit 3 continuously performs retrieval and collation of received signals, and it interrupts the CPU 7 upon reception of a message. Even after initiating a time counting operation of the timer, the decoder circuit 3 operates to retrieve a call number of the receiver in order to instruct an interrupt to the CPU 7. At each time when a call number has been retrieved and an interrupt of the CPU 7 has been made, the CPU 7 takes in and stores address information, and, after message data information has been taken in and stored, the CPU 7 resets the timer and then makes the timer restart a time counting operation (steps 2 to 5). Unless the time counting operation of the timer terminates, the receiver does not proceed to a next indicating/display operation, and all of received address information and message data information are kept retained.

Step 7: A decision is made as to whether the decoder circuit 3 does not interrupt the CPU 7 any longer, and the time counting operation of the timer has come to an end.

Step 8: The receiver proceeds to an indicating operation. This indicating operation is made only once independently of the number of messages which have been newly received.

Step 9: The receiver retrieves the newly received address information stored in step 2 and determines the priority order thereof. This information of the priority order of address information is stored in the ROM 6, and the information of the priority order of address information is sent to the CPU 7 when the switch 4 is turned on.

Step 10: The receiver reads out message data information from the RAM 5, which message data information corresponds to the address information whose priority order has been determined in step 9, and the receiver displays the message data information sequentially in accordance with the priority order of the address information thereof.

Figure 3:
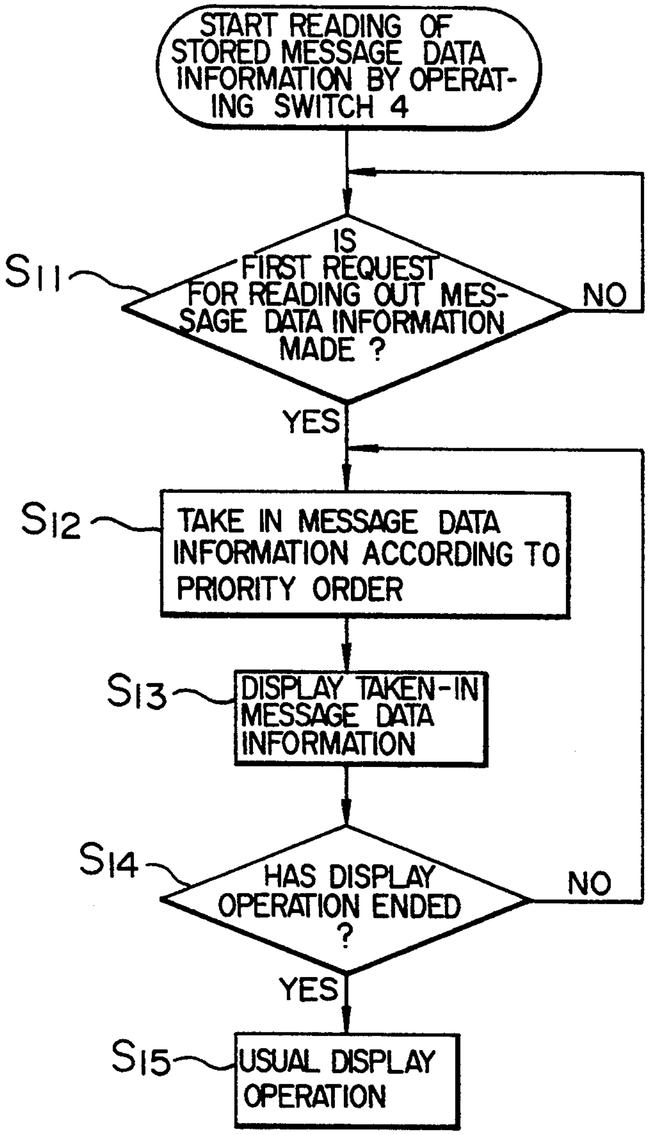
FIG. 3 is a flowchart showing the operation of the CPU when the receiver shown in FIG. 1 operates to read out stored messages.

Next, an operation of the CPU 7 when it reads out message data information will be explained with reference to the flowchart of FIG. 3.

Step 11: Generally, stored message data information is read out by the operation of the switch 4. A decision is made as to whether a first request has been made for reading out message data information by the operation of the switch 4.

Step 12: The CPU 7 takes in message data information sequentially in accordance with the priority order of the address information thereof, starting from the message data information of the highest priority order, based on the priority order data of the address information sent to the CPU 7 from the ROM 6.

Step 13: The receiver displays the message data information. If there is a request for reading out new message data information during a display operation for the already read-out message data information, the receiver compares the priority order of the address information of the new message data information with that of the address information of the displayed message data information, and the receiver takes in new message data information corresponding to the address information of the priority order which is arranged in regular sequence with respect to that of the address information of the displayed message data information (step 12), and the receiver displays the newly taken-in message data information.

Step 14: The receiver decides whether there is no new reading-out request during the display operation of message data information.

Step 15: The receiver proceeds to a display operation in a usual waiting state.

As is apparent from the above description of the embodiment of the present invention, the selective calling receiver of the present invention does not perform an indicating operation at every message reception, when a number of messages are sent successively as done in information service, but instead, upon reception of a first message, all successive messages are taken in a lump, and then only a single indicating operation is performed and simultaneously all taken-in messages are displayed sequentially, whereby the number of indicating operations can be reduced.

Further, during a message display operation, the indicating/display operations are not disturbed by successive message reception, and further reception of a second and following messages is not disturbed by a sound, etc. generated by the indicating unit, and all messages can be received efficiently without causing deterioration of reception sensitivity.

In addition, at the time of receiving a new message or reading out stored messages, the selective calling receiver of the present invention performs a display operation in accordance with the priority order determined by a user, whereby it is made possible for the user to read out a message, which is needed, promptly and easily.

The selective calling receiver of this invention has a remarkable practical effect when it is used to provide digital information, which continuously changes with time, such as a listed indication of the price of stocks, etc., for example.

I claim:

1. A selective calling receiver comprising:

receiving means for receiving data including call number data, function designation number data and message data;

memory means for storing received message data;

display means for displaying the stored message data;

timer means for starting a time counting operation upon completion of reception of the message data following reception of a call number of said receiver and outputting a control signal upon expiration of a predetermined time period;

a temporary memory circuit, responsive to a subsequent reception of the call number of said receiver before said timer means completes the time counting operation, for storing all the message data which have been received before the completion of the time counting operation of said timer means; and indicating means, receiving said control signal, for indicating reception of the data in response to said control signal.

2. A selective calling receiver according to claim 1, further comprising means for successively displaying the message data stored in said temporary memory circuit.

3. A selective calling receiver according to claim 1, wherein:

said receiver has a plurality of call numbers associated therewith, and said receiver has a plurality of addresses corresponding to said plurality of call numbers, said memory means stores the received message data by classifying the received message data for one of said plurality of addresses which is determined by the received call number of said receiver and the function designation number, and said display means operates to successively display the message data, which are stored in said memory means, in accordance with a preset priority order of addresses, and also to display the message data which are read out from said temporary memory circuit in accordance with the preset priority order of addresses, said preset priority order of addresses being selectable by a user of said selective calling receiver.

4. A selective calling receiver according to claim 1, wherein said timer means resets said time counting operation upon reception of further message data to prevent generation of said control signal until said receiver does not receive message data for said predetermined period of time.

5. A selective calling receiver according to claim 2, wherein said timer means resets said time counting operation upon reception of further message data to prevent generation of said control signal until said receiver does not receive message data for said predetermined period of time.

6. A selective calling receiver according to claim 3, wherein said timer means resets said time counting operation upon reception of further message data to prevent generation of said control signal until said receiver does not receive message data for said predetermined period of time.

* * * * *